United States Patent Office 2,847,633
Patented Aug. 12, 1958

2,847,633

ELECTROMOTOR HEADING CONTROL SYSTEM

Seymour I. Finkel, North Arlington, and John Elliot Taylor, New Milford, N. J., assignors to Bendix Aviation Corporation, Teterboro, N. J., a corporation of Delaware Application February 25, 1955, Serial No. 490,522

7 Claims. (Cl. 318—489)

This invention relates generally to control systems and more particularly to control systems for the instrument landing of aircraft.

Conventional instrument landing systems for aircraft utilize a signal corresponding to the angular displacement of the craft from the beam, various derivatives of the angular displacement signal, and a signal corresponding to the angular displacement of the craft from a selected heading for controlling the craft. The heading error signal is utilized to eliminate the possibility of the craft orbiting or circling on one side of the beam instead of tracking the beam to the transmitter. However, it has been found that under certain conditions of large beam and large heading errors, the craft may orbit despite the use of the heading error output.

An object of the present invention, therefore, is to provide a novel instrument landing system with heading responsive means providing a heading error signal for large heading errors that will be of such magnitude that the craft will turn toward the transmitter and track the guide beam.

Another object is to provide an instrument landing system for controlling an aircraft in response to beam error and heading error signals with novel means for adding a component thereto when the heading error exceeds a predetermined limit to insure that the craft's heading will be in the direction of the beam transmitter.

A further object is to provide a signal means with an arrangement whereby the signal developed corresponds to the function of the error between the actual and desired values of a parameter for one error range and differs from that function of the error for another range.

The present invention contemplates a novel instrument landing system wherein the connection between the computer which develops control effects for the aircraft from the beam and direction error signals and the direction responsive device includes an electro mechanical arrangement which responds to the heading error signal and supplies an additional component to the heading error signal when the heading error exceeds a predetermined limit.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for the purpose of illustration and description only, and are not intended as a definition of the limits of the invention.

In the drawings wherein like parts are marked alike:

Figure 1:
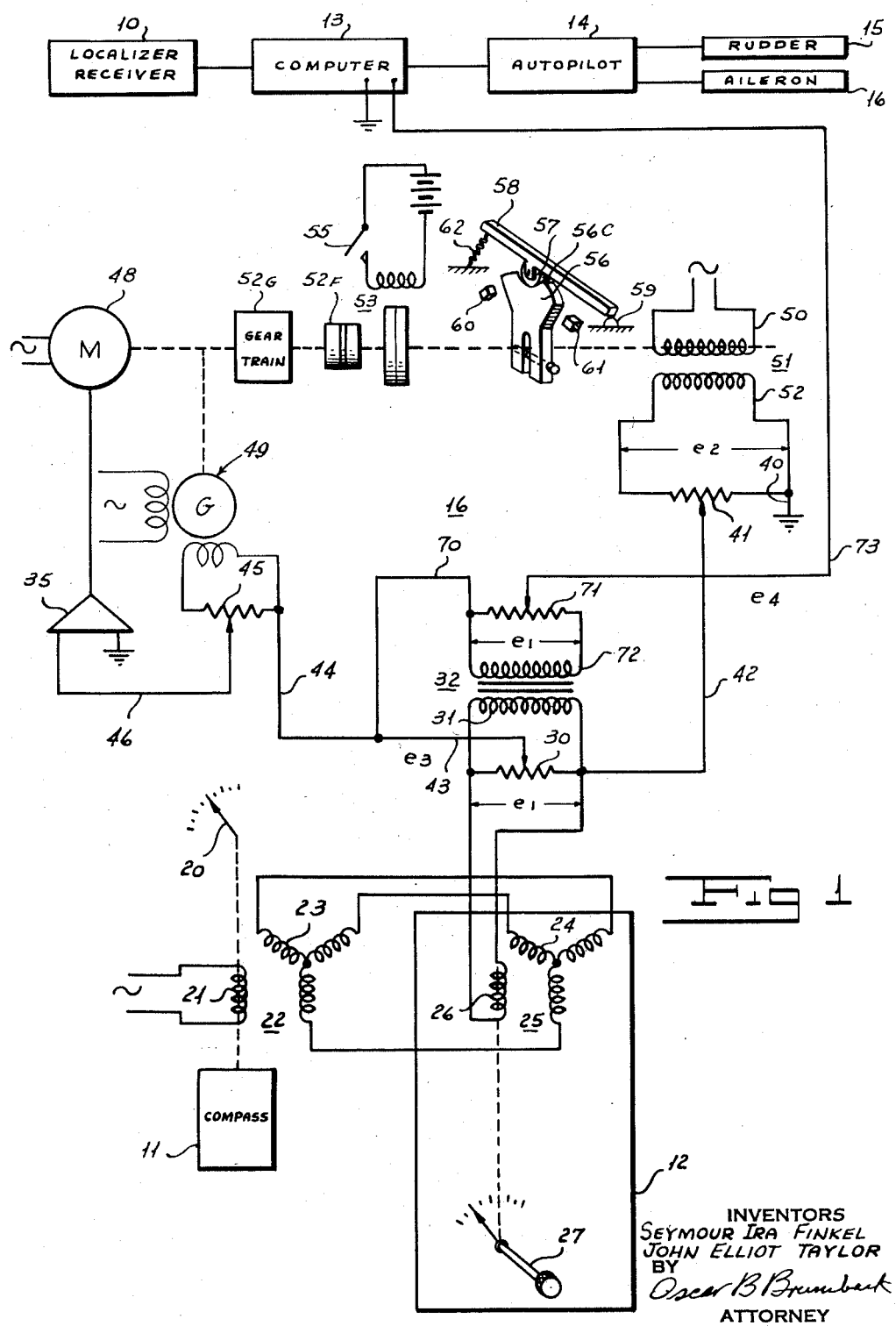
Figure 1 illustrates schematically the novel signal developing device of the present invention incorporated in an instrument landing system for aircraft.

Turning now to Figure 1, the instrument landing system for controlling the direction of the craft in response to a localizer beam comprises generally a conventional localizer receiver 10 responsive to the localizer beam for developing signals corresponding to the deviations of the craft from the beam, a conventional compass 11 responsive to the magnetic heading of the craft, a craft heading setting device 12, a computer 13 for developing control signals from the beam and heading signals, and an autopilot system 14 for controlling the rudder 15 and the aileron 16 in response to the computer signal. This system may be generally similar to that described in Patent No. 2,592,173 issued April 8, 1952, to Noxon et al.

In the embodiment herein, compass 11 may be a conventional type for moving an indicator 20 to show the magnetic heading of the craft. In a known manner, compass 11 may be connected to position the rotor 21 of a transmitter inductive device 22 relative to a stator 23 which is connected to the stator 24 of a receiver inductive device 25 whose rotor 26 is positioned by the manually operable device 27 of heading setter 12.

Figure 2:
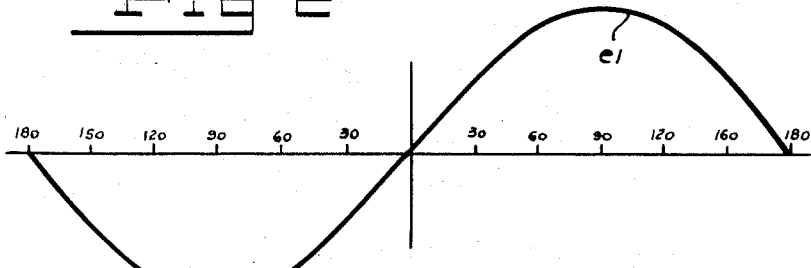
Figure 2 illustrates a signal voltage curve for the signal output $e_1$ of Figure 1 for various angular heading errors.

In such transmitter-receiver arrangement, no output $e_1$ is developed at rotor 26 as long as rotors 26 and 21 are in positional agreement. When any error in the position of rotor 21 relative to the position of rotor 26 exists, a corresponding output is developed at rotor 26. Since rotor 26 is positioned by the manually operable knob 27, which is set to the heading of the beam, the positions of rotors 21 and 26 are in agreement when the craft is on the correct heading of the beam as set by manual control 27. An error exists in the rotor position when the craft is displaced from the preset heading, and a corresponding signal is developed at rotor 26. This signal corresponds in amplitude and phase to the extent of and direction of displacement of the craft from the preset heading in accordance with the curve of Figure 2, and is applied to potentiometer 30 and the primary winding 31 of coupling transformer 32.

Potentiometer 30 is connected to amplifier 35 in a signal chain from ground lead 40 through potentiometer 41, lead 42, potentiometer 30, lead 43, lead 44, potentiometer 45, and lead 46. In response to the signal in this signal chain, amplifier 35 operates a conventional induction motor 48 to displace the rotor 50 of inductive device 51 relative to stator 52 to develop an output signal $e_2$ across potentiometer 41.

The signal from potentiometer 41 is applied to the input of amplifier 35 in opposition to the signal from potentiometer 30. When these two signals become equal and opposite, the net input to amplifier 35 is zero and the operation of motor 48 is stopped. A conventional rate generator 49 is provided to damp the operation of motor 48.

Motor 48 is drivably connected with rotor 50 through a gear train 52G, a friction clutch 52F, and a magnetic clutch 53. When switch 55 is in an open switch position, clutch 53 is disengaged and rotor 50 is maintained at a null with respect to the stator 52 by a centering arrangement comprising a bracket 56 on the rotor shaft having a cam surface 56C forming a detent engaged by a roller 57 journaled on an arm 58 which is pivoted at 59. Upon the displacement of the shaft in either direction, roller 57 is lifted out of detent against the bias of spring 62. When the torque is released, spring 62 urges roller 57 back to detent position and centers rotor 50.

Figure 3:
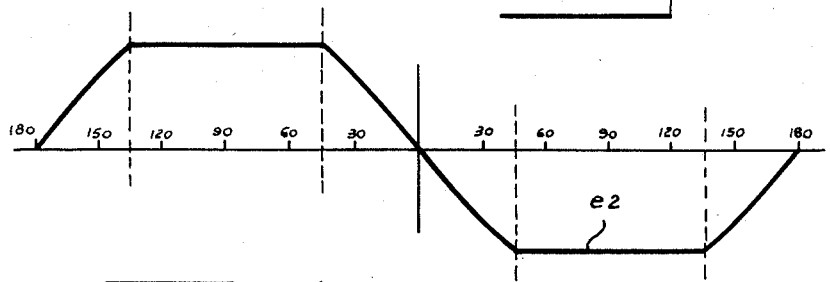
Figure 3 illustrates a signal voltage curve for the signal output $e_2$ of Figure 1 for various angular heading errors.

Stops 60 and 61 prevent a movement of the rotor shaft beyond predetermined angular limits in clockwise and counter-clockwise directions and friction clutch 52F releases the overload on the motor. Due to stops 60 and 61, the output $e_2$ of stator 52, Figure 3, is sinusoidal only within the displacement angles set as limits by the stops 60 and 61.

Figure 4:
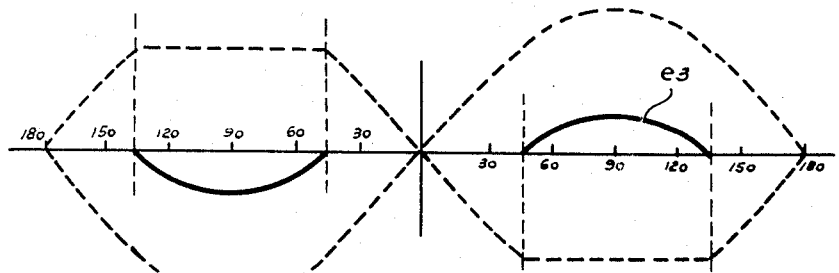
Figure 4 illustrates a signal voltage curve for the signal output $e_3$ of Figure 1 for various angular heading errors.

The output of stator 52 is in opposition to the output of rotor 26; these outputs are combined at potentiometer 30, and the resultant output $e_3$ at lead 43 is an output signal having the characteristics as shown in Figure 4. This output is applied by way of a lead 70 to a potentiometer 71 across the secondary winding 72 of transformer 32, the signal from rotor 26 being coupled by transformer 32 to potentiometer 71. Thus, the combined output $e_4$ supplied by a lead 73 to computer 13 has characteristics as shown in the curve of Figure 5.

Figure 5:
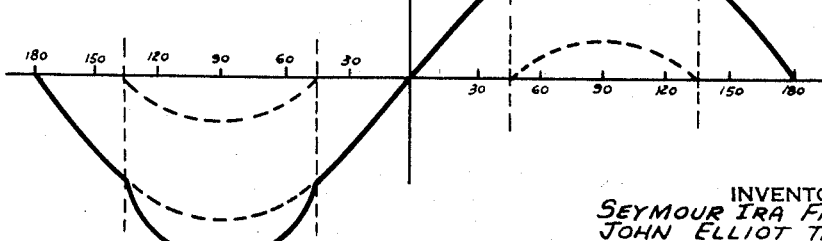
Figure 5 illustrates a signal voltage curve for the signal $e_4$ supplied to the computer of Figure 1 for various angular heading errors.

Referring now to Figure 5, it will be seen that, as long as rotor 50 is being displaced within the limits permitted by stops 60 and 61, the resulting adjustment of rotor 50 applies through the inductive device 51 a follow up signal $e_2$ across potentiometer 41 which under transient or dynamic conditions varies with the adjustment of the bracket 56 and acts in a sense to wipe out the controlling differential signal $e_3$. The follow up signal $e_2$ acts in opposition to the signal $e_1$ applied across the potentiometer 30 to provide the controlling differential signal $e_3$ to operate motor 48 until such time as the outputs across potentiometers 41 and 30 cancel as under steady state small error conditions in which case the signal supplied to computer 13 by way of lead 73 corresponds to the output from rotor 26 which is coupled by transformer 32 across potentiometer 71. For larger errors, however, exceeding the limits preset by stops 60 and 61, the output of stator 52 is limited and the component corresponding to the difference between the signals on potentiometers 41 and 30 is added to the signal from rotor 26 to give at lead 73 a signal with a greatly expanded amplitude. This signal being much greater than the heading error provides the necessary signal component to computer 13 to head the craft onto the beam in a direction toward the transmitter.

The foregoing has described a novel arrangement wherein the signal varies directly with the heading error for small angles of error and varies in amount much greater than the error for large heading error angles.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. A control system for maintaining a craft on a guide beam comprising means responsive to displacement of said craft from said beam for developing a corresponding beam error signal, means responsive to the displacement of said craft from a desired heading for developing a corresponding heading error signal, means for reproducing said heading error signal, third signal means for developing a third signal, means responsive to the difference between said first named heading error signal and said third signal for actuating said third signal means to reduce said difference to zero, means for limiting the operation of said third signal means, and means under the control of said beam error signal, said reproduced signal, and said signal difference for controlling said craft.

2. In a control system wherein a control effect is obtained from an error signal whose magnitude is a function of the error between the actual and desired values of a parameter, first signal means responsive to the values of said parameter for developing first and second outputs corresponding to said error, a second signal means having a further output connected to said second output, motor means responsive to the difference between said further output and second output for operating said second signal means to reduce said difference to zero, and means for adding said difference to said first output.

3. In a control system wherein a control effect is obtained from an error signal whose magnitude is a function of the error between the actual and desired values of a parameter, first signal means responsive to said parameter values for developing first and second outputs corresponding to said error, second signal means having an output connected to said first output, motor means responsive to the difference between said last named output and first output for operating said second signal means to reduce said difference to zero, means for limiting said last named output, and means for adding said difference to the second output whereby said second output corresponds to said error for one range of values and differs from said error for a second range of values.

4. In a control system, first signal developing means having first and second outputs, reference means responsive to the difference between the actual and the desired values of a parameter for actuating said first signal means to develop corresponding signals at said outputs, second signal developing means having a third output connected in opposition to said first output, means operable by the difference between said first and third outputs for actuating said second signal means to reduce said difference to zero, and means for adding said difference to said second output.

5. In a control system, first signal developing means having first and second outputs, reference means responsive to the difference between the actual and the desired values of a parameter for actuating said first signal means to develop corresponding signals at said outputs, second signal developing means having a third output connected in opposition to said first output, means operable by the difference between said first and third outputs for actuating said second signal means to reduce said difference to zero, and means limiting the output for said second signal means, whereby said third and first outputs cancel until said limit is reached whereupon said difference corresponds to the extent by which said first output exceeds said third output, and means for adding said difference to said second output.

6. In a control system for a craft, transmitter and receiver inductive devices, reference means responsive to the heading of said craft for positioning said transmitter device, heading preselecting means for positioning said receiver device, whereby the signal developed at said receiver corresponds to the error between the actual and preselected headings of said craft, means for applying said signal to first and second outputs, a second signal device for developing an output, motor means for actuating said second signal device, means connecting said first output and said last named output in opposition to operate said motor means by the difference in outputs to actuate said second signal device to reduce said difference to zero, means for limiting the actuation of said second signal device, whereby said difference corresponds to the extent said first output exceeds the actuation limit of said second signal device, and means for adding said difference to said second output.

7. In a control system wherein a control effect is obtained from an error signal whose magnitude is a function of the error between the actual and desired values of a parameter, first means responsive to said parameter values for developing said error signal and an auxiliary signal, means responsive to said auxiliary signal, second signal means actuated by said last-named means for developing a corrective signal, means for applying said corrective signal in opposing relation to said auxiliary signal to normally balance said auxiliary signal, means to limit said corrective signal so that the difference between the auxiliary and corrective signals corresponds to said error for one range of values and differs from said error for a second range of values, and means to apply said differential signal in aiding relation to said error signal to obtain the control effect.

References Cited in the file of this patent

UNITED STATES PATENTS 2,576,135     Moseley _____ Nov. 27, 1951

OTHER REFERENCES

Ahrend, W. R.; Servomechanism Fundamentals, p. 115, Fig. 8–1, McGraw-Hill, New York, 1954.